E. WILLIAMS.
BALL BEARING.
APPLICATION FILED MAY 11, 1922.

1,426,236.

Patented Aug. 15, 1922.

Inventor
E. Williams,
By Marks Clerk Attys.

UNITED STATES PATENT OFFICE.

EDWARD WILLIAMS, OF SMETHWICK, ENGLAND.

BALL BEARING.

1,426,236. Specification of Letters Patent. Patented Aug. 15, 1922.

Application filed May 11, 1922. Serial No. 560,204.

*To all whom it may concern:*

Be it known that I, EDWARD WILLIAMS, a British subject, residing at Benson Works, Foundry Lane, Smethwick, in the county of Stafford, England, have invented certain new and useful Improvements Relating to Ball Bearings (for which I have filed an application in Great Britain, January 26, 1921, application No. 3,254), of which the following is a specification.

This invention has for its object to provide an accurate ball bearing of superior quality which is capable of being produced by expeditious and economical manufacturing operations.

The invention comprises the construction of one member of the bearing from two rings which are situated on opposite sides of the balls, and a sleeve or bush having flanged ends for retaining the rings, the said sleeve or bush being formed with a peripheral indentation for adjusting and spacing the rings.

Also the invention comprises the employment between the aforesaid rings, of a separate ring with which the peripheral indentation of the sleeve or bush co-operates.

Referring to the accompanying sheet of explanatory drawings:—

Figure 1:
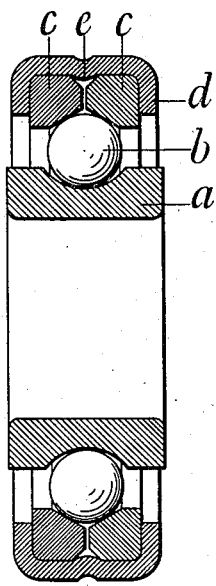
Figure 1 is a cross section of a ball bearing constructed in accordance with this invention, the two part bearing ring being the outer one.

In carrying the invention into effect as shown in Figure 1, the inner single bearing ring $a$ is made in one piece, and is grooved to locate the balls $b$. The outer bearing ring is made in two parts $c$. These are held together by a shell or sleeve $d$ having flanged ends. The adjacent faces of the rings $c$ are chamfered near their outer peripheries as shown, and into the annular recess thus formed is forced an annular indentation $e$ formed in the sleeve $d$, the indentation serving to produce the required spacing or adjustment of the rings $c$.

The sleeve $d$ (which may be made from steel tube or pressed from a steel sheet) is initially flanged at one end only, and its cylindrical portion is plain. After the parts have been assembled the other end of the sleeve is flanged, and by endwise pressure applied to the two flanges the rings $c$ are pressed tightly together. The dimensions of the parts are made such that in this operation the rings $c$ are caused to bind on the balls. A final adjusting operation is therefore necessary. This is effected by the production in the shell of the annular or peripheral indentation $e$ which forces the rings $c$ apart or relieves the pressure on the balls sufficiently to give the required freedom to the balls. In other words the spacing of the rings $c$ is determined by the indentation $e$. By the use of the indentation variations likely to occur during manufacture in the dimensions of the rings $c$ are readily compensated in a final adjusting operation. The great and costly refinement which is ordinarily necessary in the production of the component parts is thus avoided without sacrificing uniformity and accuracy in the finished product. Further the indentation serves to prevent the rings $c$ from being subsequently pressed together by any endwise pressure which may be exerted on them in service.

Figure 2:
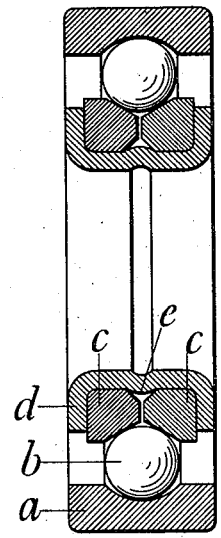
Figure 2 is a cross section of a ball bearing in which the two part bearing ring is the inner one.
Figure 5:
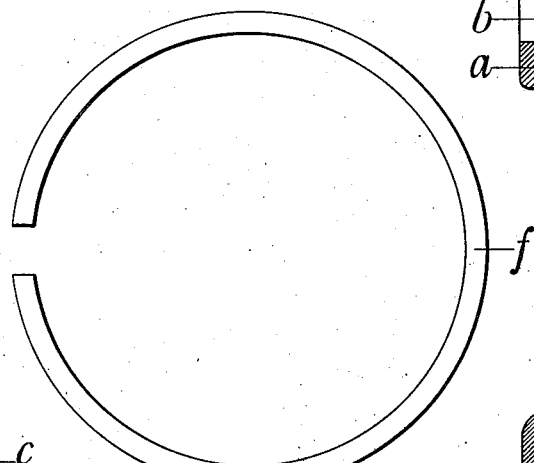
Figure 5 is a side elevation of the separate spacing ring.

The construction shown in Figure 2 differs from that of Figure 1 only in that the inner ring is made in two parts, instead of the outer one, and the said parts are held together by a flanged bush. The corresponding elements in the two constructions are indicated by the same reference letters.

Figure 3:
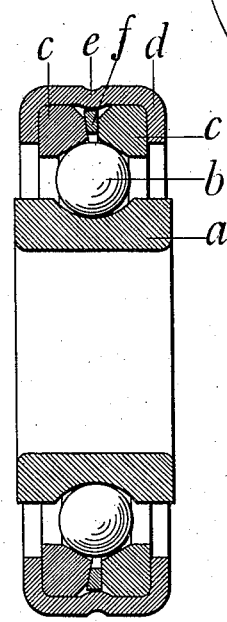
Figures 3 and 4 are cross sections of ball bearings made in accordance with this invention in which separate spacing rings are employed, the spacing ring in Figure 3 being of different cross section from that shown in Figure 4.
Figure 4:
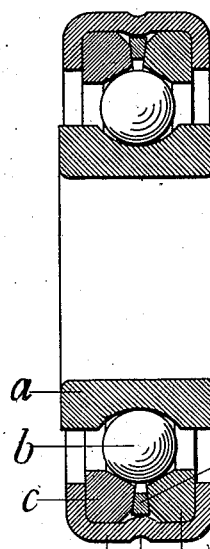

Instead of making the indentation $e$ bear directly on the adjacent inclined faces of the rings $c$, it may be caused to act on a separate split and contractible spacing ring $f$ as shown in Figures 3 and 4. In Figure 3 one of the rings $c$ is formed with a slightly inclined intermediate face, whilst the corresponding face on the other ring is flat. The spacing ring $f$ is made to a corresponding section, so that when the inner periphery of the indentation $e$ in the sleeve bears on the ring $f$ it is forced more or less between the rings $c$ to produce the final adjustment. The construction shown in Figure 4 differs from that of Figure 3 only in that both of the intermediate faces of the rings $c$ and both outer faces of the ring $f$ are inclined. If desired the spacing ring $f$ may be made of circular cross section.

Instead of producing the indentation after the parts have been assembled, it may be formed before the sleeve or bush $d$ is flanged, the rings $c$ being placed in position on opposite sides of the indentation, and the ends of the sleeve or bush turned over subsequently. Or the sleeve or bush may be flanged at one end and the indentation produced after one ring $c$ has been inserted. The final adjustment is made by increasing the depth of the original indentation. Or the indentation may be made excessively deep in the first instance; the final adjustment is then effected by pressure on the end flanges causing the rings $c$ to force out or reduce the indentation sufficiently to permit the required proximity of the rings $c$.

Having thus described my invention what I claim as new and desire to secure by Letters Patent is:—

1. In combination, an inner race ring, an outer race ring, a single row of rolling elements arranged between said rings, one of said rings consisting of two annular sections arranged on opposite sides of a perpendicular line intersecting the axis of said rings, said sections being provided with shaped surfaces engaging opposite sides of each of said rolling elements, and a shell cooperating with said sections and having end flanges engaging the outer side surfaces of the sections, said shell being provided intermediate its ends with an annular depressed portion extending between said sections for preventing said sections from binding on the rolling elements.

2. A combination as claimed in claim 1 in which a spacing ring is arranged between said sections and engages the depressed portion of said shell.

3. A combination as claimed in claim 1 in which an expansible split ring is arranged between said sections and engages the depressed portion of said shell.

4. A combination as claimed in claim 1 in which a spacing ring is arranged between said sections and has one of its sides beveled, and one of said sections being provided with a corresponding beveled face engaging the beveled surface of said spacing ring.

5. A combination as claimed in claim 1 in which the adjacent surfaces of said sections are beveled, and an expansible spacing ring arranged between said sections and having its opposite sides beveled, the beveled sides of said spacing ring engaging the beveled surfaces of said sections.

In testimony whereof I have signed my name to this specification.

EDWARD WILLIAMS.